C. W. STARKER.
AXLE COLLAR.
APPLICATION FILED JULY 14, 1915.
1,255,482.
Patented Feb. 5, 1918.
2 SHEETS—SHEET 1.
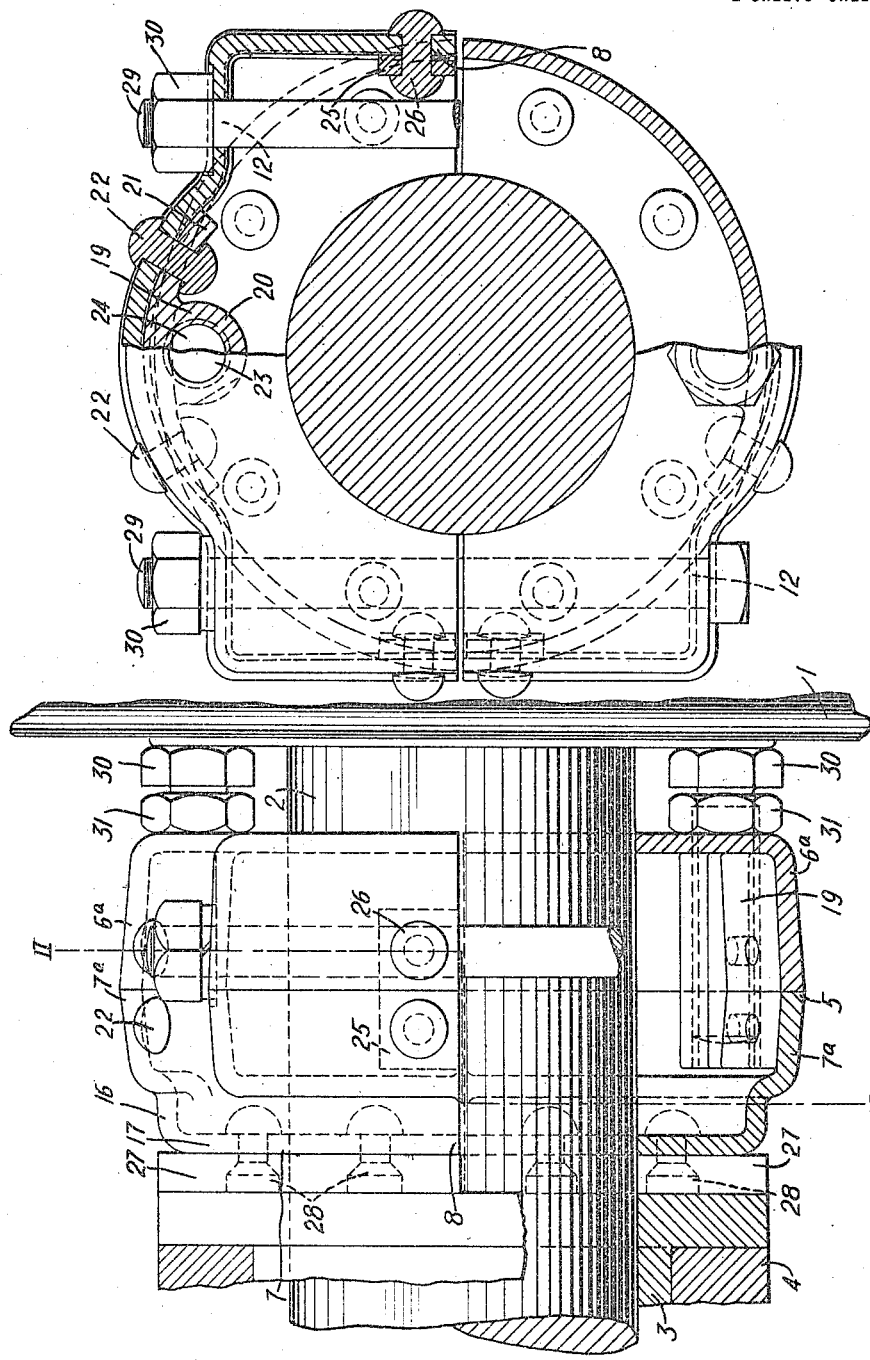
WITNESSES:
Fred A. Lind
O. W. Kennedy
INVENTOR
Charles W. Starker
BY
Wesley G. Carr
ATTORNEY

C. W. STARKER.
AXLE COLLAR.
APPLICATION FILED JULY 14, 1915.

1,255,482.

Patented Feb. 5, 1918.
2 SHEETS—SHEET 2.

WITNESSES:
Fred A. Lind
O. W. Kennedy

INVENTOR
Charles W. Starker
BY
Wesley S. Carr
ATTORNEY

UNITED STATES PATENT OFFICE.

CHARLES W. STARKER, OF PITTSBURGH, PENNSYLVANIA, ASSIGNOR TO WESTINGHOUSE ELECTRIC AND MANUFACTURING COMPANY, A CORPORATION OF PENNSYLVANIA.

AXLE-COLLAR.

1,255,482.

Specification of Letters Patent.

Patented Feb. 5, 1918.

Application filed July 14, 1915. Serial No. 39,776.

*To all whom it may concern:*

Be it known that I, CHARLES W. STARKER, a subject of the Emperor of Germany, and a resident of Pittsburgh, in the county of Allegheny and State of Pennsylvania, have invented a new and useful Improvement in Axle-Collars, of which the following is a specification.

My invention relates to axle inclosing devices for spacing purposes and it has particular reference to divided axle collars for positioning electric motors on the wheel axles of electric railway vehicles.

The object of my invention is to provide a divided axle collar that shall be particularly light in weight as well as simple and inexpensive in construction.

The usual form of divided axle collar comprises two semi-cylindrical castings or pressed metal members that are fastened together to inclose the axle by suitable clamping devices. In order to permit of longitudinal adjustment of the collar, as a whole, means, such as separate and longitudinally disposed bolts operating in threaded lugs, are usually provided.

According to my present invention, I provide a divided axle collar of pressed-metal construction in which each half thereof is formed of separate portions arranged in side-by-side relation with respect to the axle and secured together by suitable means which also permit of the longitudinal adjustment of the collar as a whole, along the axle. The separate portions constituting each half of the collar are formed from cup-shaped pressed-metal members that are divided along their central axes. Thus, the assembled halves of the axle collar may be made of any desired overall length by varying the depth of one or both of the cup-shaped members.

Figure 3:
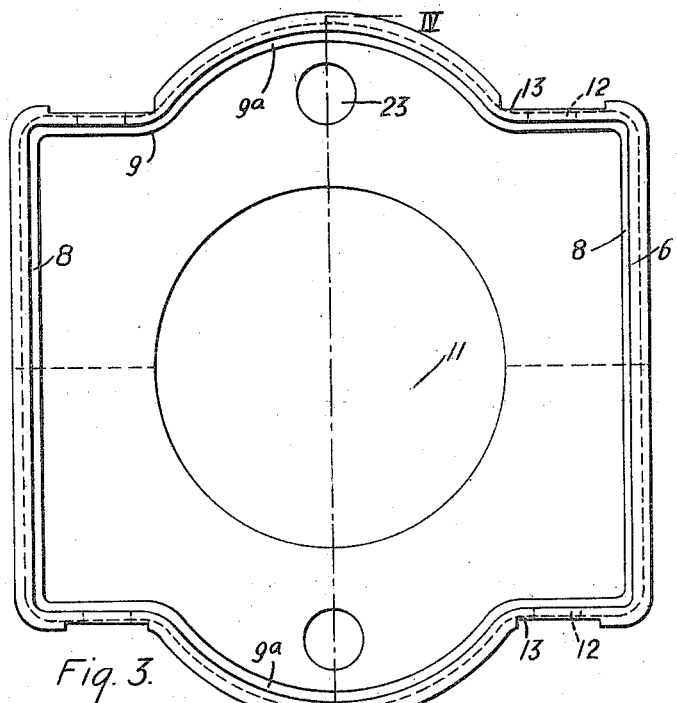
Figure 4:
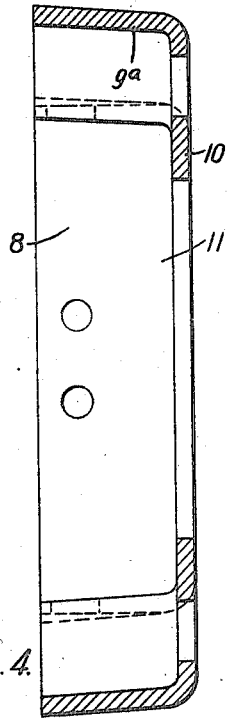
Figure 5:
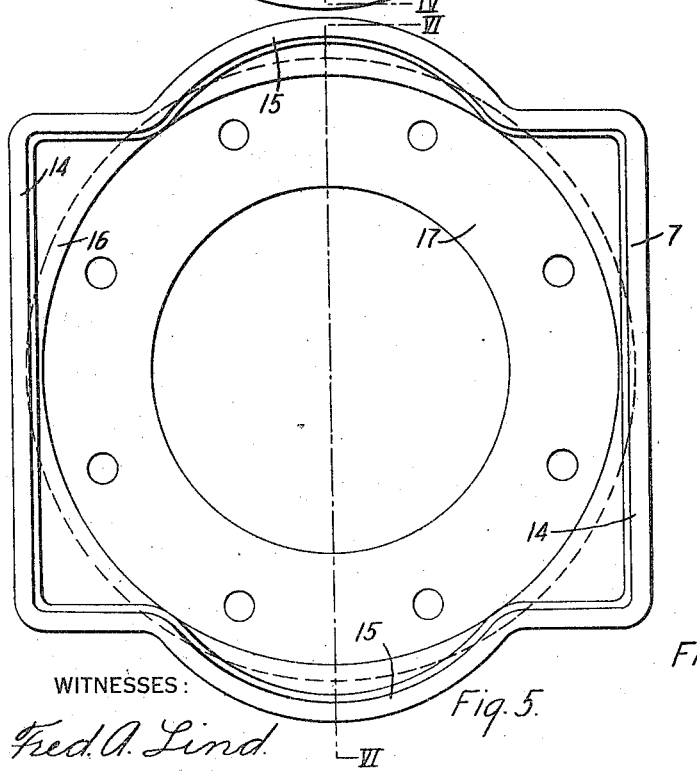
Figure 6:
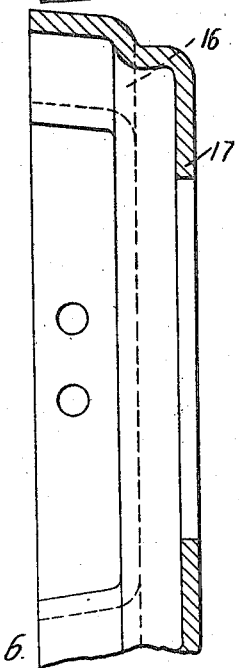

In the accompanying drawings, Figure 1 is a view, partially in section and partially in side elevation, of a divided axle collar constructed in accordance with my invention and applied to the axle of an electric vehicle; Fig. 2 is a view, partially in front elevation and partially in section, along the line II—II of Fig. 1; Fig. 3 is a plan view of one of the pressed-metal members. Fig. 4 is a sectional view along the line IV—IV of Fig. 3; Fig. 5 is a plan view of another of the pressed-metal members and Fig. 6 is a sectional view along the line VI—VI of Fig. 5.

Referring to Fig. 1, a wheel 1 is mounted on a suitable shaft or axle 2 that is adapted to be driven by an electric motor (not shown). The motor is provided with a suitable axle bearing 3 that is inclosed by a portion 4 of the motor frame. The axle bearing 3 is spaced a predetermined distance from the wheel 1 by a divided axle collar 5. The collar 5 comprises a pair of substantially identical half portions which inclose the axle 2 and are secured together by means which will hereinafter be described. Each half of the axle collar 5 comprises oppositely disposed portions $6^a$ and $7^a$ which are arranged in side-by-side relation along the axle 2. The corresponding portions $6^a$ and $7^a$ of the complete axle collar 5 are formed from cup-shaped pressed-metal members 6 and 7, as best shown in Figs. 3 and 5. The member 6 is pressed from a suitable sheet-metal blank and is formed with two parallel walls 8—8 and two walls 9—9 at right angles thereto which are expanded outwardly to form intermediate curved portions $9^a$—$9^a$. The walls 8—8 and 9—9 are oppositely inclined toward each other and are bent at right angles along their inner edges to form a base portion 10. The base 10 is provided with a central opening 11, the diameter of which is substantially equal to the diameter of the axle 2. The straight portions of the walls 9 are provided with alined openings 12 and with annular depressions 13 surrounding the openings. The member 6 is divided along its horizontal axis, as indicated by the dotted lines in Fig. 3, to form identical half portions $6^a$. The pressed-metal member 7 is formed with walls 14—14 and 15—15 similar in contour to the walls 8—8 and 9—9, respectively, of the member 6. The walls 14—14 and 15—15 are oppositely inclined toward each other and are severally contracted to form a cylindrical portion 16 which terminates in an annular flange 17, as best shown in Fig. 6. The inner diameter of the annular flange 17 is substantially equal to the diameter of the shaft 2. The member 7 is divided along its horizontal axis, as indicated by the dotted lines to form identical half portions 7ª. As best shown in Figs. 1 and 2, the portions 6ª and 7ª, constituting each half of the axle collar, are secured together, with the walls 8 and 9 respectively coinciding with the walls 14 and 15 by means of a joint 19. The joint 19 comprises a cylindrical portion 20 and a pair of outwardly extending curved flanges 21. The flanges 21 engage the curved portions 9ª and 15ª of the walls 9 and 15, respectively, and are secured thereto by means of rivets 22. The base 10 of the portion 6ª is provided with a circular opening 23 that registers with an opening 24 which is provided in the cylindrical portion 20 of the joint 19. The portions 6ª and 7ª are further secured together by means of a plate 25 that is in engagement with the walls 8 and 14, respectively, and rivets 26. The exterior surface of the flange 17 is provided with a semi-annular wearing plate 27 of hard fiber or other similar material which is secured to the flange by means of rivets 28. The assembled halves of the axle collar 5 are clamped together by means of bolts 29 that extend through the openings 12 and nuts 30 in threaded engagement with the bolts. The axle collar 5, as a whole, is positioned on the shaft so that the wearing plates 27 closely engage the end of the bearing member 3, by means of positioning bolts 31 that are in threaded engagement with the openings 24 of the joint 19. The heads of the bolts 30 abut the surface of the wheel 1, and the axle collar is maintained in any predetermined position by means of lock nuts 31 coacting with the bolts 30.

From the foregoing, it is apparent that divided axle collars of any desired length may be formed by providing a number of pressed-metal cup-shaped members of varying depth, and suitably combining the pairs of semi-cup-shaped portions. In this way, axle collars may be constructed for a wide range of spacing requirements by the use of a few simple tools and a comparatively small number of component parts.

While I have shown my invention in a simple and preferred form, it is not so limited but is susceptible of various minor changes and modifications within the scope of the appended claims.

I claim as my invention:

1. The combination with an axle and a machine frame disposed thereon, of a divided collar inclosing the said axle, each member of the said collar comprising separate oppositely disposed portions, means for securing the said portions together in alinement, clamping means for the collar members, and members adjustable with respect to the said first named means for positioning the collar, as a whole, along the axle.

2. The combination with an axle and a machine frame disposed thereon, of a divided collar inclosing the said axle, each member of the said collar comprising separate and oppositely disposed semi-cup-shaped portions, means for securing the said portions together in alinement, clamping means for the collar members, and members adjustable with respect to the said first named means for positioning the collar as a whole along the axle.

3. An axle collar comprising oppositely disposed cup-shaped portions respectively having laterally extending walls and a member located entirely within said cup-shaped portions and engaging adjacent walls of the said cup-shaped portions and secured thereto.

4. An axle collar comprising oppositely disposed cup-shaped portions and a member located within said portions and comprising a cylindrical portion provided with an opening that registers with an opening in one of said cup-shaped portions, and flanges secured to adjacent walls of said cup-shaped portions.

5. An axle collar comprising oppositely disposed cup-shaped portions having abutting walls and means located entirely within said portions for securing the said walls together in alinement to form a continuous outer surface.

6. The combination with an axle and a machine frame disposed thereon, of a divided collar inclosing the said axle, each member of the said collar comprising oppositely disposed semi-cup shaped portions having abutting walls, means for securing the said walls together in alinement, to form a continuous surface, clamping means for the collar members, and members adjustable with respect to the said first named means for positioning the collar, as a whole, along the said axle.

7. An axle collar comprising oppositely disposed cup-shaped portions and a member in engagement with the inner surfaces of the adjacent walls of said portions and secured thereto.

8. The combination with an axle and a machine frame disposed thereon, of a collar inclosing the said axle and comprising oppositely disposed portions, means for securing the said portions together in alinement, and means adjustable with respect to said first named means for positioning the collar, as a whole, along said axle.

9. The combination with an axle and a machine frame disposed thereon, of a collar inclosing the said axle and comprising oppositely disposed cup-shaped portions, members located within said cup-shaped portions for securing said portions together and other members coacting with said first-named members for positioning the collar, as a whole, along said axle.

10. The combination with an axle and a machine frame disposed thereon, of a collar inclosing the said axle and comprising oppositely disposed cup-shaped portions, members respectively provided with flanges secured to the adjacent walls of said cup-shaped portions and a threaded portion, and bolts coacting with said threaded portions for positioning the collar, as a whole, along said axle.

In testimony whereof, I have hereunto subscribed my name this 30th day of June 1915.

CHARLES W. STARKER.

Copies of this patent may be obtained for five cents each, by addressing the "Commissioner of Patents, Washington, D. C."